United States Patent [19]
McFarren

[11] 3,913,894
[45] Oct. 21, 1975

[54] CONTINUOUS FEED MIXING APPARATUS

[75] Inventor: John E. McFarren, Orangevale, Calif.

[73] Assignee: Thompson Chemicals, Inc., Palo Alto, Calif.

[22] Filed: Apr. 18, 1974

[21] Appl. No.: 461,949

[52] U.S. Cl. .......... 259/8; 416/90
[51] Int. Cl.[2] .......... B01F 7/18; B01F 7/26
[58] Field of Search .......... 259/8, 9, 10, 23, 24; 416/90

[56] References Cited

UNITED STATES PATENTS

| | | | |
|---|---|---|---|
| 2,953,359 | 9/1960 | Mau | 259/8 |
| 3,400,915 | 9/1968 | Onishi | 259/8 |
| 3,420,506 | 1/1969 | Gurley | 259/8 X |

*Primary Examiner*—Harvey C. Hornsby
*Assistant Examiner*—Alan Cantor
*Attorney, Agent, or Firm*—Limbach, Limbach & Sutton

[57] ABSTRACT

A flowable material, such as a powder, for example, is combined with a liquid in a mixing chamber in which the liquid is sprayed out from the top of an agitator which is rotated within the mixing chamber. The liquid is pumped through a hollow passage within the agitator and the spraying out of the liquid from the top of the agitator not only helps create a suction, which causes the flowable material to be pulled into the mixing chamber, but it also acts as a fluid shield against outwardly directed splashes of the mixture. The agitator is made up of a plurality of annular spacer and disc blade units removably stacked on a rotatable shaft. The disc blades have generally flat blade tips to cut down on the creation of turbulence in the mixture which would otherwise generate undesirable heat.

6 Claims, 8 Drawing Figures

CONTINUOUS FEED MIXING APPARATUS

BACKGROUND OF THE INVENTION

The invention relates generally to an apparatus for mixing a liquid with a flowable material, such as a powder, for example, and particularly to an apparatus which is especially designed for mixing together the components of plastic materials for use in various manufacturing processes and even more particularly for use in processes wherein the plastic is sprayed, such as in the fabrication of fiberglass.

In such a mixer the flowable material may be a powdered plastic resin and the liquid may be a catalyst, for example. The mixture of the catalyst with the plastic resin causes it to polymerize. The catalyzed plastic resin, as is well known in the art, will eventually harden. One important factor controlling the rate at which the catalyzed plastic resin hardens is its temperature. If the catalyzed plastic resin is inadvertently heated during the mixing process due to friction between the mixing agitator and the elements being mixed, the mixture will tend to harden prematurely causing clogs to form in the mixing apparatus which will shut down the sprayer. Once the sprayer is shut down the whole system must be immediately cleaned to prevent its destruction by the rapidly hardening catalyzed plastic resin. This problem increases the labor and material costs of such manufacturing.

Prior art mixers suffer from a number of problems in carrying out the mixing operation. In some prior art mixers, when the flowable material is poured into the mixer, a cloud of dust escapes which presents housekeeping problems. Furthermore, it often happens that the catalyzed resin is splashed out of the inlet of the mixer which then hardens on the outside of the mixer and its environment. This, too, creates housekeeping problems.

Still another problem of some wet and dry material mixers for plastics has been that the catalyzed mixture splashes at the top of the mixing chamber and forms a bridge at the top. This bridge interferes with the effective mixing of the materials and eventually requires the system to be shut down, dismantled and cleaned.

Still another disadvantage of many prior art mixers is that the liquid and flowable material do not become fully combined until they are well into the mixing chamber. This sometimes causes lumps of the catalyzed resin to form and these lumps create a frictional force which produces heating. Still another factor which produces heating is that the unevenly mixed catalyzed resin tends to coat the mixing blades thereby dulling them. The dulled blades tend to generate more heat in the mixture than relatively sharp blades.

As stated above, when undesirable heat is introduced into the catalyzed resin mixture it tends to harden prematurely and thereby either becomes more viscous and difficult to pump or it forms hard clumps which clog the sprayer altogether and require the system to be shut down and immediately cleaned. The only remedy heretofore for coated blades was to disassemble the machine and chip off the coating on the leading edges of the blades. Eventually this ruins the blades.

In some prior art mixers the length of the mixing blades is nearly equal to the radius of the mixing chamber and either no spacers or only relatively small diameter spacers between the agitator mixing blades are used. This prior art design has the disadvantage that the portion of the mixture nearest the axis of revolution of the agitator is not effectively mixed because of the low angular velocity of the mixing blades at this point.

SUMMARY OF THE INVENTION

The above and other disadvantages are overcome by the apparatus of the present invention for mixing a liquid with a flowable material comprising a mixing chamber having an opening for receiving the flowable material and an opening for ejecting the mixture and an agitator rotatably mounted within the mixing chamber and having a fluid carrying passage therein. The agitator further has spray means in fluid communication with the agitator passage. The spray means are located at the end of the agitator which is nearly adjacent to the receiving end opening of the mixing chamber and are for spraying the liquid into the mixing chamber from the fluid passage and in a direction away from the receiving end opening. The sprayed liquid takes a cone shape and thereby creates a suction force which helps draw the flowable material into the chamber. The cone spray also creates a fluid shield which prevents any splashes of the mixed material from being ejected out of the receiving end opening of the mixing chamber. The mixing apparatus further includes means for pumping the liquid into the agitator passage and means for rotating the agitator within the mixing chamber.

In one preferred embodiment of the invention, the agitator includes a shaft which is rotated by a motor and a plurality of integrally formed blade and spacer units which are stacked on the shaft. The spacers are of a diameter sufficient to create a relatively narrow annular space between the exterior of the spacers and the interior surface of the mixing chamber. The mixture is thus confined within this annular space at the outer periphery of the mixing discs. Each mixing disc is substantially flat and has a plurality of substantially flat, circumferentially spaced blades along its outer periphery.

The shaft of the agitator is hollow and has a fluid passage therein. The spray means includes a dome shaped disc which is fitted on the shaft on the end closest to the receiving end opening of the mixing chamber and a hollow concave dome member which is also fitted on the shaft and spaced apart from the exterior surface of the dome shaped nozzle member. Together the hollow dome and the dome shaped nozzle form a dome shaped orifice which is pointed in the direction away from the receiving end opening of the mixing chamber. The resultant spray out of the orifice is in the shape of a cone which intersects the walls of the mixing chamber.

Because the cone shaped spray is directed away from the receiving end opening of the mixing chamber, it creates a suctional force which helps pull the flowable material into the mixing chamber. Also, the spray of the liquid downwardly towards the exit end of the mixing chamber prevents the mixture from splashing out of the receiving end opening of the mixing chamber.

By mixing the liquid with the flowable material at the top of the mixing chamber rather than at its bottom or midsection, the mixture is more even and very few, if any, lumps are formed. Moreover, the combination of having flat mixing blades together with the more even mixture which is initially introduced to the mixing chamber results in a reduction in the generation of heat during mixing which thereby leads to a more stabilized reaction.

It is therefore an object of the present invention to provide an improved apparatus for mixing a liquid with a flowable material which does not create lumps;

It is another object of the invention to provide an apparatus for mixing a liquid with a flowable material whereby the injection of the liquid into a mixing chamber creates a suction which helps pull the flowable material into the mixing chamber;

It is still another object of the invention to provide an apparatus for mixing a liquid with a flowable material in a continuous fashion wherein the liquid is sprayed into the mixing chamber in a manner which prevents the mixture from splashing out of the receiving end opening of the mixing chamber;

It is a still further object of the invention to provide apparatus for mixing a liquid with a flowable material wherein the agitator of the mixing apparatus may be easily disassembled for cleaning.

The foregoing and other objectives, features and advantages of the invention will be more readily understood upon consideration of the following detailed description of certain preferred embodiments of the invention, taken in conjunction with the accompanying drawings.

DETAILED DESCRIPTION OF CERTAIN PREFERRED EMBODIMENTS

Figure 1:
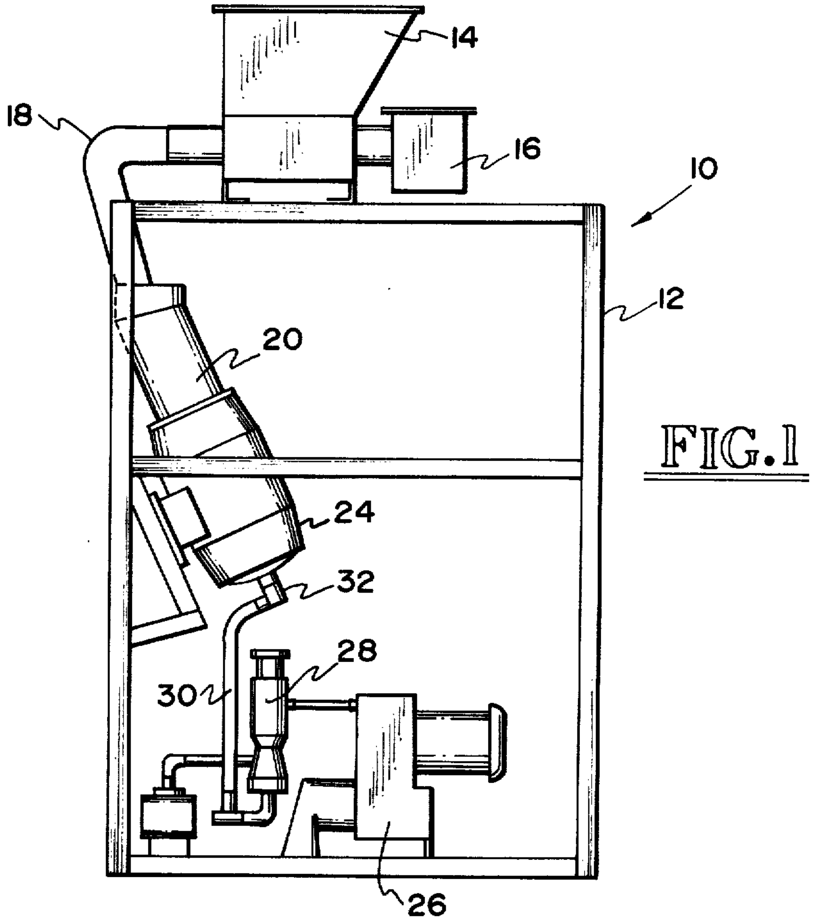
FIG. 1 is a side elevational view of a mixing apparatus according to the invention.

Referring now more particularly to FIG. 1, the mixing apparatus 10 is supported vertically in a housing (casing) 12. The flowable material, such as the powdered plastic resin, is loaded into a hopper 14 situated on top of the casing 12. A screw feed metering device (not shown) within the bottom of the hopper 14 is rotated by a motor 16 to cause the flowable material to be metered out into a feed tube 18 at the bottom of the hopper. The feed tube 18 connects with the entrance of a mixing chamber 20 situated below the hopper mechanism 14.

As will be explained in greater detail in reference to FIGS. 2 and 3, the mixing chamber 20 contains an agitator 22 (FIGS. 2 and 3) which is rotated within the chamber 20 by an electric motor 24. At the bottom of the casing 12, the liquid, such as a catalyst for the plastic resin, is pumped from an external source (not shown) by a variable speed pump 26 through a metering device 28 which is connected to the end of the shaft of the motor 24 by a hose 30. The attachment of the hose 30 to the end of the motor shaft is by means of a rotary fluid coupling 32. The motor shaft has a bore (not shown) through its length and, as will be explained in greater detail hereinafter, the bore in the motor shaft is connected with a hollow passage 56 (FIG. 3) within the agitator 22.

Figure 2:
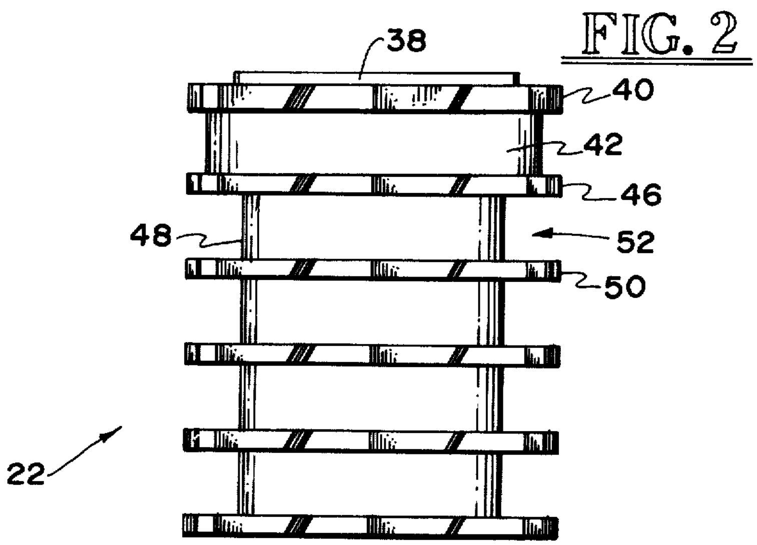
FIG. 2 is an enlarged perspective view of the agitator member of the embodiment depicted in FIG. 1.
Figure 3:
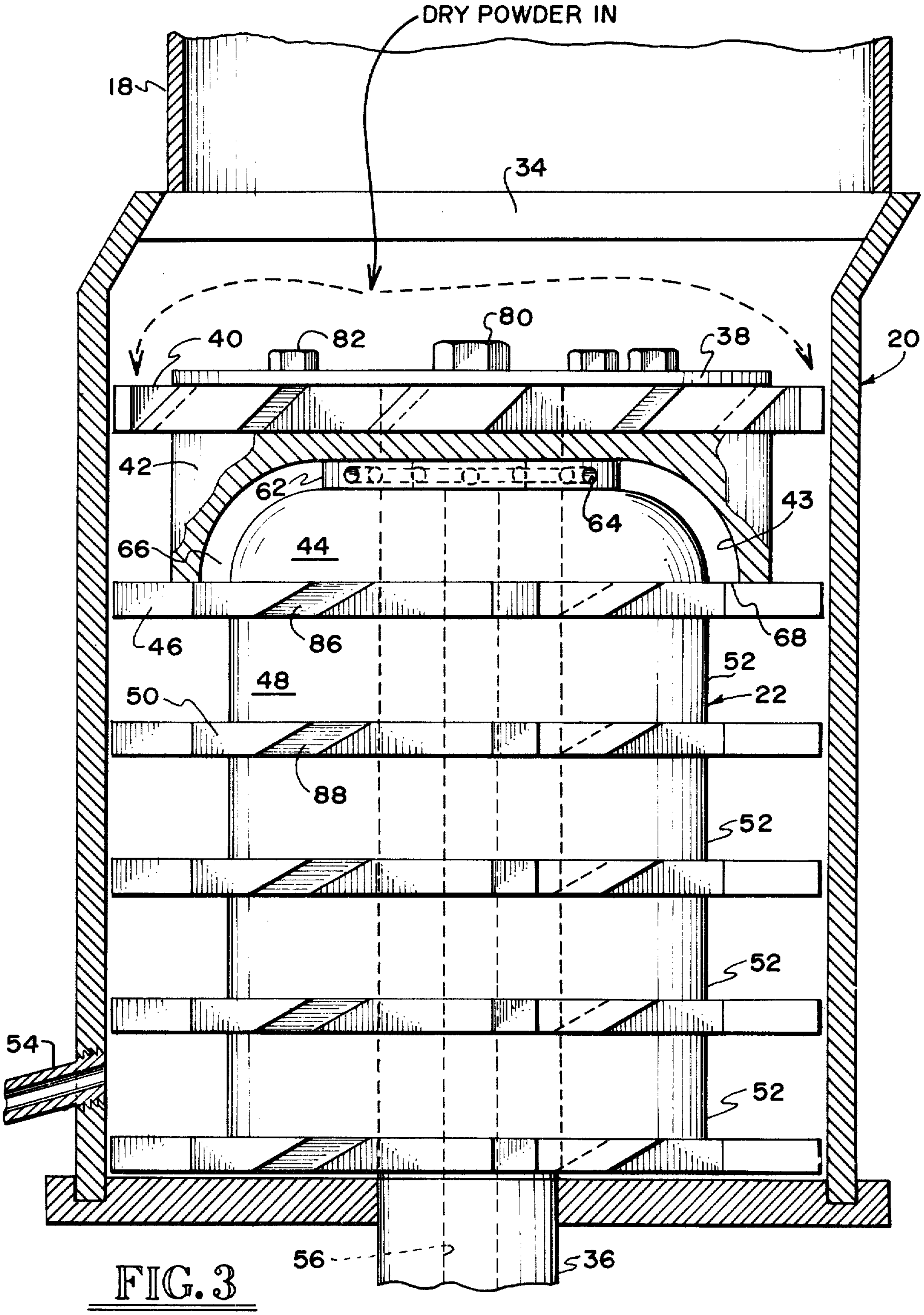
FIG. 3 is an enlarged view, partly in section and with portions broken away of the mixing chamber and agitator portions of the embodiment of FIG. 1.

Referring now more particularly to FIGS. 2 and 3, the agitator and mixing chamber will be explained in greater detail. The flowable material from the feed tube 18 is received into the mixing chamber 20 at an entrance opening 34. Within the mixing chamber 20 and aligned coaxially with its longitudinal axis is the agitator 22. The agitator 22 is comprised of a rotatable shaft 36 on which are stacked, in succession, beginning from the end closest to the opening 34, a top plate 38, a flowable material dispersion disc 40, a cylindrical member 42 which has a hollow concave dome 43 within it, a dome shaped nozzle member 44 together with a mixing blade disc 46, a cylindrical spacer 48, and a mixing blade disc 50.

The spacer 48 and the blade 50 are actually integrally formed as one unit 52 and a plurality of these spacer and blade units 52 are thereafter stacked along substantially the entire length of the shaft 36 within the mixing chamber 20. Each blade and spacer unit 52 is coated with a polyurethane covering having a hardness of approximately 80 deurometers. At the end of the mixing chamber 20 opposite the opening 34 is an exit opening 54 through which the mixture is ejected from the mixing unit to a spraying apparatus (not shown), for example.

Figure 8:
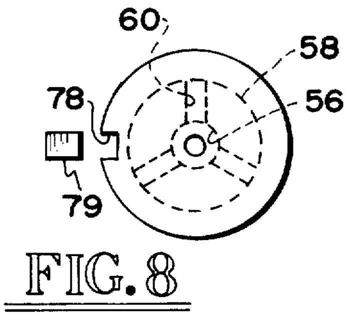
FIG. 8 is an end view of the agitator shaft taken generally along the line 8—8 of FIG. 7.
Figure 7:
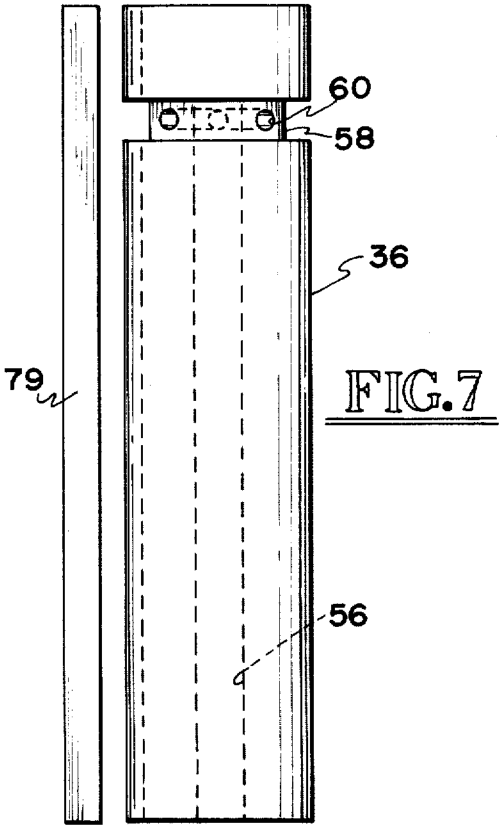
FIG. 7 is an enlarged side view of the agitator shaft of the embodiment of FIG. 1.

The agitator shaft 36 contains a hollow fluid passage in the form of a closed ended bore 56. As best shown in FIGS. 7 and 8, the shaft 36 is provided with an annular groove 58 at the point where the dome shaped nozzle member 44 is attached. Within the groove 58 are a plurality of circumferentially spaced, diametric bores 60 which provide fluid communication between the groove 58 and the passage 56. The dome shaped nozzle member 44 has its rounded, dome portion directed toward the top plate 38 and has a shoulder 62 on top of the rounded portion which is in alignment with the shaft groove 58. When the nozzle member 44 is slid onto the shaft 36 to cover the groove 58 an annular chamber is formed between the shoulder 62 and the groove 58. The shoulder 62 has a plurality of circumferentially spaced bores 64 which are in fluid communication with this annular chamber.

The domed surface of the nozzle member 44 is in coaxial alignment and spaced apart from the concave, interior surface 43 of the hollow member 42 so that a generally hemispherically shaped space 66 is thereby formed between them. The diameter of the nozzle member 44 at its widest point is substantially the same as the diameter of the spacers 48 and the interior diameter of the hollow member 42 is greater than either the diameter of the nozzle member 44 or the spacers 48. Thus, the hemispherical space 66 has an annular orifice 68 which faces away from the opening 34 of the mixing chamber 20. The annular orifice 68 has a shape which conforms to the shape (i.e. cylindrical) of the opening 34.

In operation, the liquid, such as a fluid catalyst, is pumped through the passage 56 by the pump 26 and is sprayed out of the bores 64 in the shoulder 62. The spray is conducted to the annular orifice 68 by means of the hemispherically shaped space 66 and is sprayed downwardly towards the exit opening 54 and away from the entrance opening 34. Because the agitator member 22 is rotated at moderate speed by the motor 24, the spray fans out to take a cone shape until it intersects the interior surface of the mixing chamber 20.

This cone shaped spray forms a sort of fluid shield to prevent the mixture within the chamber 20 from either splashing out of the entrance opening 34 or forming a hardened bridge at the opening. It also creates a suction which helps pull the flowable material in through the entrance opening 34 and over the feeder dispersion plate 40. When the flowable material and the liquid first contact each other, they are both in essentially a fluid state so that complete and thorough mixing takes place and clumping is eliminated. Furthermore, the cone shaped spray tends to clean the mixer blades 46 and 50 at the upper end of the agitator thereby preventing them from becoming coated with the catalyzed mixture.

As best illustrated in FIG. 3, the top plate 38, the dispersion disc 40, and the blades 46 and 50 are all essentially flat discs having blades on their outer periphery (except for the top plate 38 which has no blades). The dispersion disc 40, the hollow member 42, the nozzle member 44, and the spacer and blade units 42 are all provided with center holes 74 which have key ways 76. The holes 74 are substantially the same in diameter as the shaft 36 and the shaft 36 is provided with a corresponding key way slot 78 into which a key member 79 (FIGS. 7 and 8) is inserted to hold the entire assembly in a rigidly connected manner. The agitator assembly is held on the shaft 36 by a bolt 80 threaded into the free end of the shaft 36 through the top plate 38. Three other bolts 82, which are radially spaced from the bolt 80, pass lengthwise through the agitator 22 through holes 84 to further rigidify the agitator assembly.

Figure 4:
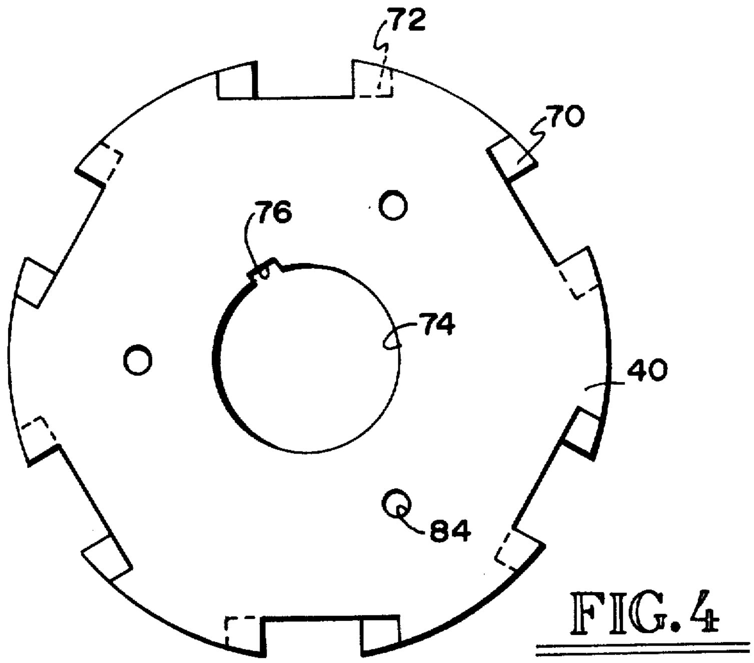
FIG. 4 is an enlarged plan view of the dispersion plate of the embodiment of FIG. 1.
Figure 5:
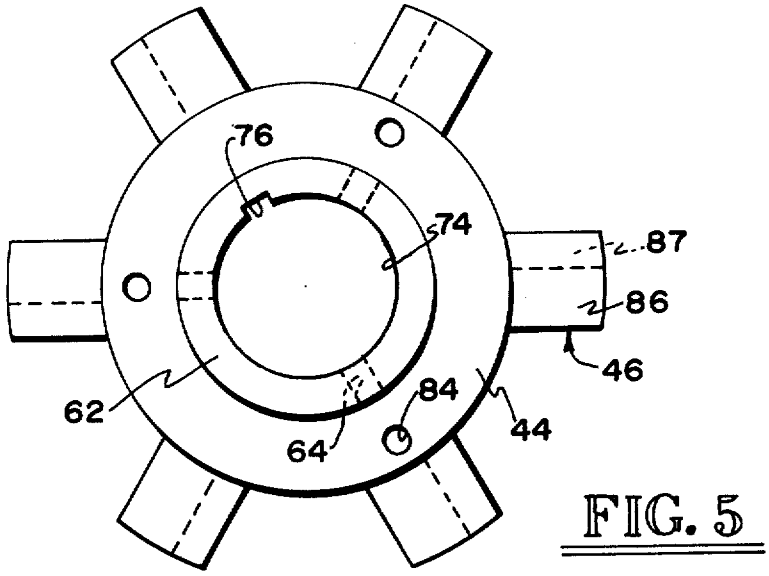
FIG. 5 is an enlarged plan view of the liquid dispersion nozzle member of the embodiment of FIG. 1.
Figure 6:
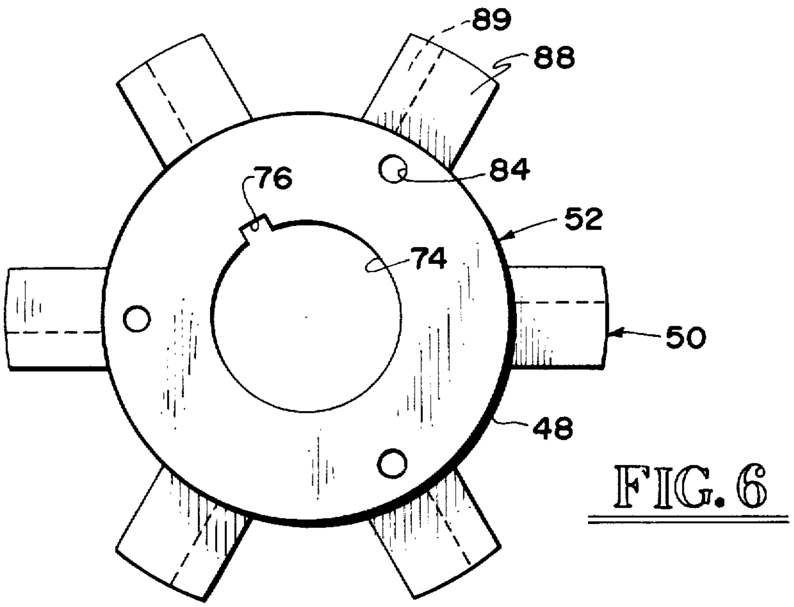
FIG. 6 is an enlarged plan view of the agitator blade-spacer unit of the embodiment of FIG. 1.

The dispersion disc 40 is provided with a series of double facing, circumferentially spaced blade edges 70 and 72 (FIG. 4) so that the disc 40 acts like a fan and helps create a suction to pull down the flowable material through the entrance opening 34 and spread it evenly within the mixing chamber 20. Each of the blade discs 46 (FIG. 5) and 50 (FIG. 6) have a plurality of circumferentially spaced, substantially flat blades 86 and 88, respectively. Each of the blades 86 and 88 have inclined blade edges 87 and 89, respectively, which may be angled either upwardly or downwardly depending on the mixing characteristics desired for the agitator. Since the units which make up the agitator 22 are removable from the shaft, they can likewise be returned to the shaft in an inverted orientation to change the mixing characteristics of the agitator 22.

The flat design of the blades 86 and 88 was chosen so that the mixing takes place with little or no turbulence. In effect, the mixture molecules are stretched rather than severed. This helps to reduce undesirable heat which otherwise accererates the polymerization reaction to cause clumping.

The diameter of the spacers 48 is chosen to be less than the diameter of the blade discs 50 by an amount equal to the length of the blades 88 so that the mixture is confined essentially to a relatively narrow annular space in which the blades 88 are rotated at their highest angular velocity.

While the mixing apparatus of the invention has been described above with particular reference to powdered resins and liquid catalysts, it should be apparent that the mixer has applications in other types of mixing operations, such as in the manufacture of adhesives or paints.

While the phrase "flowable material" has been used in the description above to mean primarily a powdered resin, in other embodiments or applications the flowable material may be another powdered material, a liquid or even a slurry. In all cases the design of the mixing apparatus of the invention prevents the mixture from being splashed out, heated by friction, and from forming lumps. Furthermore, while the liquid described above is primarily with reference to a catalyzing agent in other applications or embodiments it can be any other fluid, such as a solvent, for example.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:

1. Apparatus for mixing a fluid with a flowable material comprising a mixing chamber having an entrance opening for receiving the flowable material and an exit opening for ejecting the mixture, an agitator rotatably mounted within the mixing chamber and having a fluid carrying passage, the agitator further having spray means in fluid communication with the agitator passage and located at one end adjacent to the entrance opening for spraying fluid within the agitator passage into the mixing chamber in a direction away from the entrance opening, the spray means creating a suction into the entrance opening of the mixing chamber, means for pumping the fluid into the agitator passage, and means for rotating the agitator within the mixing chamber.

2. A mixing apparatus as recited in claim 1 wherein the spray means has a shape which conforms to the shape of the entrance opening of the mixing chamber.

3. Apparatus for mixing a fluid with a flowable material comprising a mixing chamber having an entrance opening for receiving the flowable material and an exit opening for ejecting the mixture, an agitator rotatably mounted within the mixing chamber and having a fluid carrying passage, a shaft, a plurality of flat discs stacked on the shaft, each disc having substantially flat, circumferentially spaced blades on its outer periphery, and spacers stacked on the shaft between each disc, each disc and at least one adjacent spacer being integrally formed and being removable from the shaft, the agitator further having spray means in fluid communication with the agitator passage and located at one end adjacent to the entrance opening for spraying fluid within the agitator passage into the mixing chamber in a direction away from the entrance opening, means for pumping the fluid into the agitator passage, and means for rotating the agitator within the mixing chamber.

4. A continuous feed mixing apparatus for mixing a liquid with a flowable material comprising a generally cylindrical mixing chamber having an entrance opening at one end for receiving the flowable material and an exit opening at its other end for expelling the mixture, an agitator having a first fluid carrying passage therein, a rotatable shaft, a plurality of blade and spacer units stacked along the length of the shaft, a generally flat disc mounted on one end of the shaft in the entrance opening of the mixing chamber for evenly dispersing the flowable material within the mixing chamber, and annularly shaped spray means in fluid communication with the first passage, the spray means including a dome shaped nozzle member and a hollow, concave dome member spaced apart from the nozzle member and coaxial with it, the hollow dome and the dome shaped nozzle members forming between them a hemispherically shaped second fluid passage for spraying fluid in the first passage in a direction generally away from the entrance opening of the mixing chamber, the dome shaped nozzle member and the hollow dome member being coaxially mounted at the one end of the shaft between the blade and spacer units and the dispersion disc with the spherically rounded ends of the dome shaped nozzle and the hollow dome members pointing away from the blade and spacer units, and means for rotatably mounting the agitator within the mixing chamber with the end of the agitator having the spray means being adjacent to the entrance opening, the mounting means including means for rotating the agitator within the mixing chamber, and means for pumping the liquid through the first and second passages to cause it to spray into the mixing chamber through the spray means.

5. Apparatus for mixing a liquid with a flowable material comprising a mixing chamber having an entrance opening for receiving the flowable material and an exit opening for ejecting the mixture, an agitator rotatably mounted within the mixing chamber and having a fluid carrying passage, the agitator further having means for creating a suction into the mixing chamber at the entrance opening, spray means in fluid communication with the agitator passage and located at one end nearly adjacent to the entrance opening for spraying fluid within the agitator passage into the mixing chamber in a direction away from the entrance opening, means for pumping the liquid into the agitator passage, and means for rotating the agitator within the mixing chamber.

6. A mixing apparatus as recited in claim 5 wherein the suction creating means includes a fan member in the form of a flat bladed disc which is located on the agitator between the spray means and the entrance opening of the mixing chamber.

* * * * *